(12) United States Patent
Mushaben

(10) Patent No.: US 6,475,591 B2
(45) Date of Patent: *Nov. 5, 2002

(54) MICROPOROUS LAMINATE WITH PIN-HOLE FREE AREAS

(75) Inventor: Thomas G. Mushaben, Cincinnati, OH (US)

(73) Assignee: Clopay Plastic Products Company, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/910,241

(22) Filed: Jul. 20, 2001

(65) Prior Publication Data

US 2001/0053433 A1 Dec. 20, 2001

Related U.S. Application Data

(63) Continuation of application No. 09/124,583, filed on Jul. 29, 1998, now Pat. No. 6,265,045.

(51) Int. Cl.[7] .................................................. B32B 3/14
(52) U.S. Cl. ..................... 428/77; 428/156; 428/167; 428/172; 428/179; 428/182; 428/186; 604/385.1; 604/385.2
(58) Field of Search ......................... 428/77, 156, 167, 428/172, 179, 182, 186; 604/385.1, 382.2

(56) References Cited

U.S. PATENT DOCUMENTS

| 2,714,571 A | 8/1955 | Irion et al. ................... 154/139 |
| 3,058,868 A | 10/1962 | Schroeder .................... 156/153 |
| 3,622,422 A | 11/1971 | Newman ...................... 156/306 |
| 3,832,267 A | 8/1974 | Liu .............................. 161/116 |
| 4,153,664 A | 5/1979 | Sabee ........................... 264/289 |
| 4,376,147 A | 3/1983 | Byrne et al. ................. 428/167 |
| 4,379,197 A | 4/1983 | Cipriani et al. ............. 428/220 |
| 4,452,845 A | 6/1984 | Lloyd et al. ................. 428/220 |
| 4,472,328 A | 9/1984 | Sugimoto et al. ............. 264/41 |
| 4,517,714 A | 5/1985 | Sneed et al. ................... 28/103 |
| 4,522,203 A | 6/1985 | Mays ........................... 128/132 |
| 4,582,871 A | 4/1986 | Noro et al. .................. 524/413 |
| 4,596,738 A | 6/1986 | Metcalfe et al. .......... 428/308.4 |
| 4,614,679 A | 9/1986 | Farrington, Jr. et al. .... 428/138 |
| 4,626,574 A | 12/1986 | Cancio et al. ............... 525/240 |
| 4,692,368 A | 9/1987 | Taylor et al. ................ 428/137 |
| 4,705,812 A | 11/1987 | Ito et al. ........................ 521/92 |
| 4,705,813 A | 11/1987 | Ito et al. ........................ 521/92 |
| 4,725,473 A | 2/1988 | Gompel ....................... 428/156 |
| 4,753,840 A | 6/1988 | Van Gompel ............... 428/171 |
| 4,777,073 A | 10/1988 | Sheth .......................... 428/155 |
| 4,814,124 A | 3/1989 | Aoyama et al. ............... 264/41 |
| 4,921,652 A | 5/1990 | Tsuji et al. .................... 264/41 |

(List continued on next page.)

FOREIGN PATENT DOCUMENTS

EP 141592 5/1985

OTHER PUBLICATIONS

Schwarz, Eckhard C. A., New Fibrillated Film Structures, Manufacture and Uses, Pap. Synth. Conf. (TAPPI), 1976, pp. 33–39. No Month.

*Primary Examiner*—Nasser Ahmad
(74) *Attorney, Agent, or Firm*—Wood, Herron & Evans, L.L.P.

(57) ABSTRACT

The method and apparatus of the present invention prevents the formation of pin-holes during stretching of strip laminates in the cross machine direction. Pin-holes are prevented by creating slack areas along the length of the web where the edges of the non-woven strips meet with the polymer film, pressing the slack areas into the interdigital stretching rollers without stretching the slack areas, and stretching the remainder of the web in a typical manner. The slack regions are formed prior to interdigitation by, for example, formation of a furrow, a fold or a corrugation.

16 Claims, 6 Drawing Sheets

U.S. PATENT DOCUMENTS

| | | | |
|---|---|---|---|
| 4,921,653 A | 5/1990 | Aoyama et al. | 264/41 |
| 5,035,941 A | 7/1991 | Blackburn | 428/286 |
| 5,143,679 A | 9/1992 | Weber et al. | 264/288.8 |
| 5,202,173 A | 4/1993 | Wu et al. | 428/131 |
| 5,246,429 A | 9/1993 | Poccia et al. | 604/368 |
| 5,344,691 A | 9/1994 | Hanschen et al. | 428/152 |
| 5,409,761 A | 4/1995 | Langley | 428/198 |
| 5,547,761 A | 8/1996 | Chapman, Jr. et al. | 428/422 |
| 5,686,160 A | 11/1997 | Yamada et al. | 428/67 |
| 6,265,045 B1 * | 7/2001 | Mushaben | 428/77 |

* cited by examiner

MICROPOROUS LAMINATE WITH PIN-HOLE FREE AREAS

RELATED APPLICATION

This is a continuation application of U.S. application Ser. No. 09/124,583 filed Jul. 29, 1998, now U.S. Pat. No. 6,265,645.

FIELD OF THE INVENTION

The present invention relates to methods and devices for preventing the formation of pinholes in the production of laminates of non-woven webs and polymer film. In particular, these laminates have spaced laminated strips of non-woven webs and film with areas of nonlaminated film therebetween (herein referred to as "zone laminates").

BACKGROUND OF THE INVENTION

Methods of making microporous film products have been known for some time. For example, U.S. Pat. No. 3,832,267, to Liu, teaches the melt-embossing of a polyolefin film containing a dispersed amorphous polymer phase prior to stretching or orientation to improve gas and moisture vapor transmission of the film. According to the Liu '267 patent, a film of crystalline polypropylene having a dispersed amorphous polypropylene phase is embossed prior to biaxially drawing (stretching) to produce an oriented imperforate film having greater permeability. The dispersed amorphous phase serves to provide microvoids to enhance the permeability of the otherwise imperforate film to improve moisture vapor transmission (MVT). The embossed film is preferably embossed and drawn sequentially.

Many other patents and publications disclose the phenomenon of making microporous thermoplastic film products. For example, European patent 141,592 discloses the use of a polyolefin, particularly ethylene vinyl acetate (EVA) containing a dispersed polystyrene phase which, when stretched, produces a voided film which improves the moisture vapor permeability of the film. The EP '592 patent also discloses the sequential steps of embossing the EVA film with thick and thin areas followed by stretching to first provide a film having voids which, when further stretched, produces a net-like product. U.S. Pat. Nos. 4,596,738 and 4,452,845 also disclose stretched thermoplastic films where the dispersed phase may be a polyethylene filled with calcium carbonate to provide the microvoids upon stretching. Later U.S. Pat. Nos. 4,777,073; 4,921,653; and 4,814,124 disclose the same processes described by the above-mentioned earlier publications involving the steps of first embossing a polyolefin film containing a filler and then stretching that film to provide a microporous product.

U.S. Pat. Nos. 4,705,812 and 4,705,813 disclose microporous films having been produced from a blend of linear low density polyethylene (LLDPE) and low density polyethylene (LDPE) with barium sulfate as the inorganic filler having an average particle diameter of 0.1–7 microns. It is also know to modify blends of LLDPE and LDPE with a thermoplastic rubber such as KRATON. Other patents such as U.S. Pat. No. 4,582,871 disclose the use of thermoplastic styrene block tripolymers in the production of microporous films with other incompatible polymers such as styrene. There are other general teachings in the art such as the disclosures in U.S. Pat. Nos. 4,921,652 and 4,472,328.

The stretching, as discussed above, results in the appearance of stripes along the length of the web. These stripes are caused by the difference in appearance between the highly stretched areas, occurring between the digits on the inter-digital rolls, and the areas at the digits which are not as highly stretched. These methods result in stripes of highly stretched, highly porous areas adjacent moderately stretched, but still substantially porous, areas.

Relevant patents regarding extrusion lamination of unstretched non-woven webs include U.S. Pat. Nos. 2,714,571; 3,058,868; 4,522,203; 4,614,679; 4,692,368; 4,753,840 and 5,035,941. The above '863 and '368 patents disclose stretching extruding polymeric films prior to laminating with unstretched non-woven fibrous webs at pressure roller nips. The '840 patent discloses preforming non-woven polymeric fiber materials prior to extrusion laminating with films to improve bonding between the non-woven fibers and films. More specifically, the '840 patent discloses conventional embossing techniques to form densified and undensified areas in non-woven base piles prior to extrusion lamination to improve bonding between non-woven fibrous webs and films due to the densified fiber areas. The '941 patent also teaches that unstretched non-woven webs that are extrusion laminated to single-ply polymeric films are susceptible to pinholes caused by fibers extending generally vertically from the plane of the fiber substrate and, accordingly, this patent discloses using multiple co-extruded film plies to prevent pinhole problems. Furthermore, methods for bonding loose non-woven fibers to polymeric film are disclosed in U.S. Pat. Nos. 3,622,422; 4,379,197 and 4,725,473.

U.S. patent application Ser. No. 08/547,059 (herein incorporated by reference in its entirety), now abandoned, discloses a process and apparatus to continuously perform web splitting, separating, guiding and laminating steps in a single unit. A single wide web of a non-woven is slit into a number of narrow webs which are separated by the use of turning bars and steered into a laminator. More specifically, a web is unrolled from a wide roll of non-woven material. The incoming web is slit into narrow webs, the narrow webs move down line to turning bars which are displaced one from the other by a desired web separation distance. The spaced narrow webs are then guided into a nip of rollers for extrusion lamination with a polymer film. A molten polymer is extruded into the nip at a temperature above its softening point to form a polymeric film laminated to the narrow webs. The compressive force between the webs and the extrudate at the nip is controlled to bond one surface of the web to the film to form the laminate. The resulting laminate includes spaced strips of non-woven laminated to the polymer film with areas of nonlaminated film between the strips.

U.S. patent application Ser. No. 08/722,286 (herein incorporated by reference in its entirety), a Continuation-In-Part of U.S. patent application Ser. No. 08/547,059, discloses a process and apparatus to continuously perform lamination of a polymer to another material to which it is laminated. The '286 application is directed to a process and apparatus to continuously perform non-woven web splitting, folding, guiding and laminating steps in a single unit. Depending on the spacing between folded webs, each strip of polymer may include a loose flap on either side of the laminate area which may be suitable for forming a barrier cuff in a diaper or other hygiene product. The spacing between folded webs determines the width of the loose polymer flap which is formed. Again, the resulting laminate includes spaced strips of non-woven laminated to the polymer film with areas of nonlaminated film between the strips. These laminates, having spaced laminated strips of non-woven and film with areas of nonlaminated film therebetween, are referred to as zone laminates. The resulting laminate includes spaced strips of non-woven laminated to the polymer film with areas of nonlaminated film between the strips.

SUMMARY OF THE INVENTION

With the development of the above referenced zone laminates, it has been discovered that pin-holes form at the boundary area between the laminated and non-laminated areas when the zone laminate is made microporous by stretching across the length of the strip. The method and apparatus of the present invention prevents the formation of pin-holes during such stretching of zone laminates. Pinholes are prevented by creating slack areas along the length of the web where the edges of the non-woven strips meet with the polymer film, pressing the slack areas into interdigital stretching rollers without stretching the slack areas, and stretching the remainder of the web by interdigitation. The slack regions are formed prior to interdigitation by, for example, formation of a furrow, a fold or a corrugation.

In one embodiment, the present invention includes a first interdigital roller and a second interdigital roller and at least one disc for contacting a slack area in the laminate and pressing the slack area into the first interdigital roller without stretching the slack area. In a preferred form, the device includes at least one disc which interengages with spaced rollers to create a slack area along the length of a laminate, the interengaged disc and rollers being laterally adjustable to create the slack area in a predetermined position on the width of the web.

These and other advantages and features, which characterize the invention, are set forth in the claims. For a better understanding of the invention, and of the advantages and objectives attained through its use, reference should be made to the Drawings, and to the accompanying descriptive matter, in which exemplary embodiments of the invention are described.

DETAILED DESCRIPTION

The method and apparatus of the present invention prevent the formation of pin-holes at the boundary area of a zone laminate at the edges of a non-woven strip during interdigital stretching. Pin-holes form at the edge of the non-woven strip because the film and non-woven laminate is substantially stronger than the adjacent unlaminated polymer film; therefore, substantially all of the stretching occurs in the unlaminated film of the boundary area. It has been discovered that this excessive stretching in the boundary areas causes the formation of pin-holes.

Figure 1:
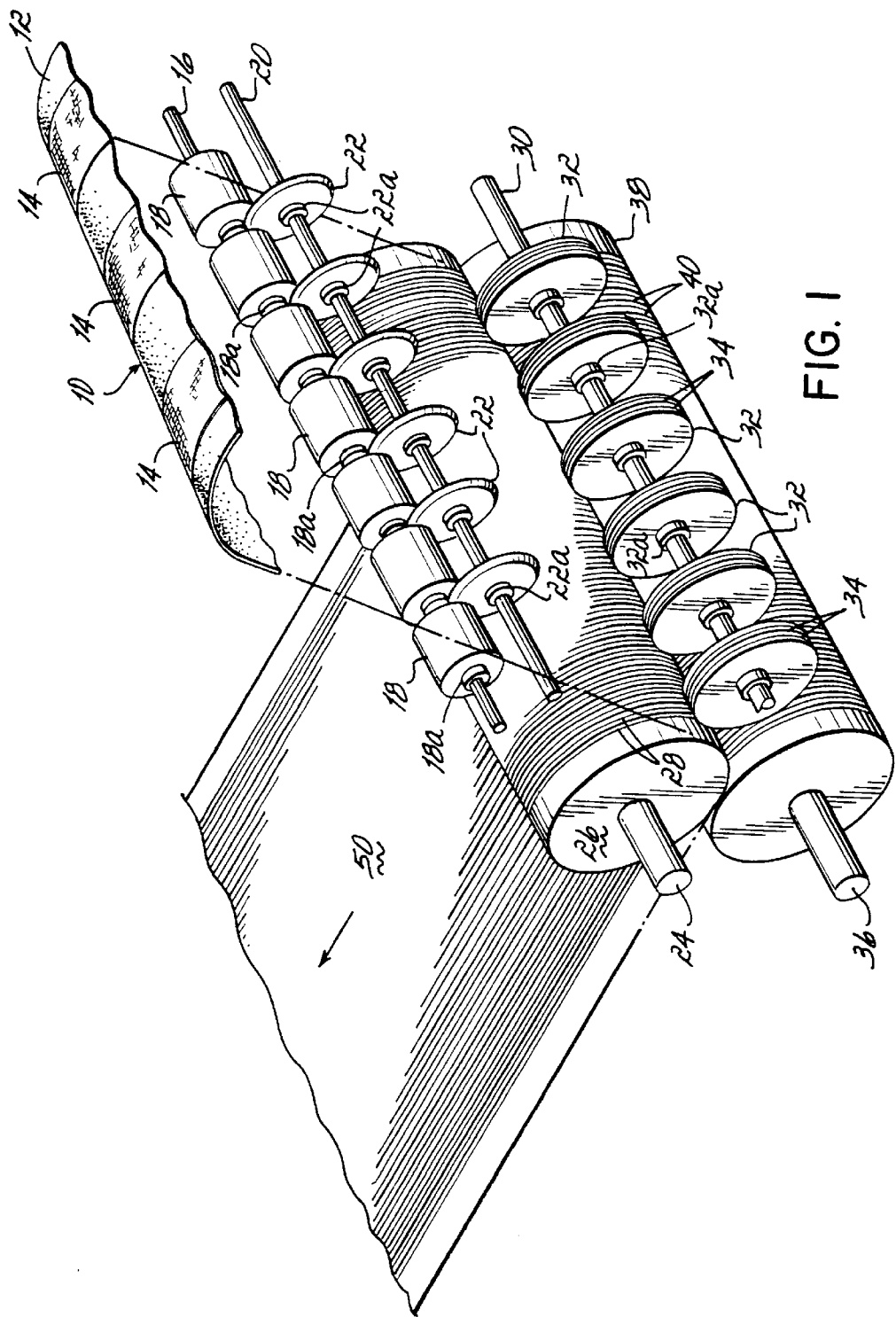
FIG. 1 is a schematic perspective view showing an apparatus for pinhole prevention in zone laminates in accordance with one embodiment of the present invention.
Figure 13:
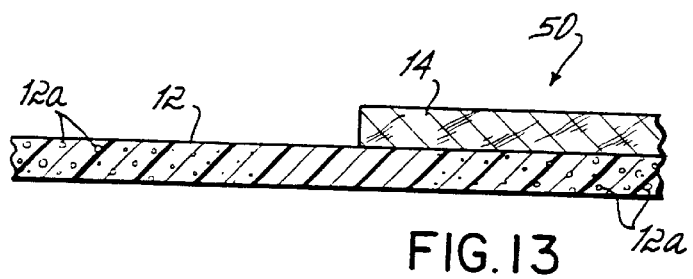
FIG. 13 is an enlarged schematic cross-sectional view of the boundary area of the laminate after interdigital stretching.
Figure 3:
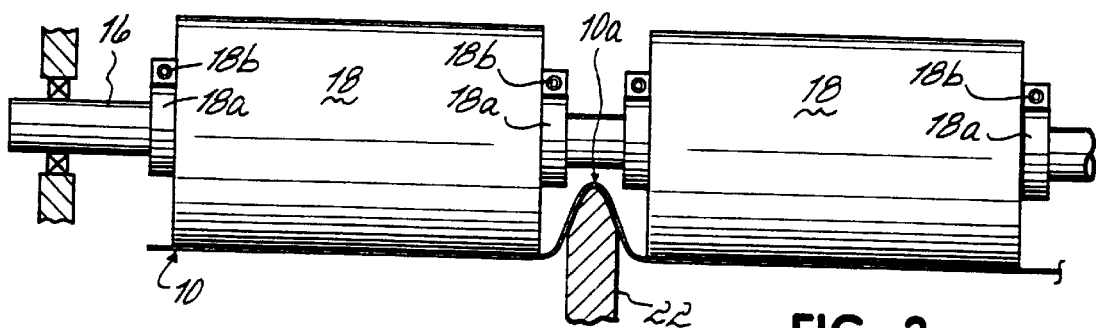
FIG. 3 is a cross-sectional view taken along line 3—3 of FIG. 2 of spacer discs and a furrow disc suitable for creating a slack area in a laminate in accordance with the present invention.
Figure 3A:
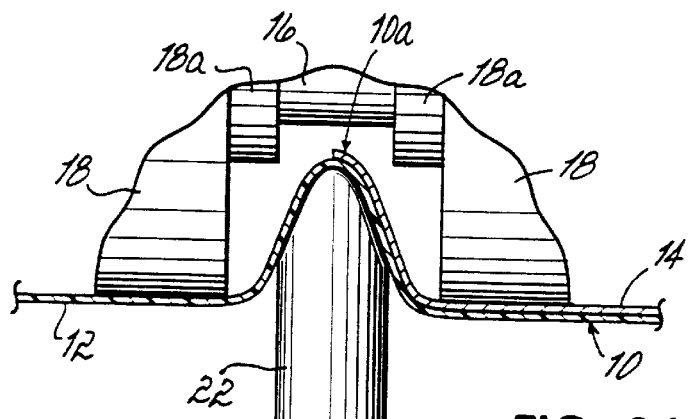
FIG. 3A is an enlarged plan view of the spacer discs and furrow discs shown in FIG. 3.

In order to prevent pin-holing, the present invention provides for the formation of a slack area 10a at the boundary areas of the laminate, that is, where the edge of the non-woven strips 14 meet the polymer film 12 in laminate 10, as shown in FIGS. 1, 3A and 13. In order to create these slack areas a number of spacer discs 18 which are slidably mounted on axle 16 are positioned such that the gap between adjacent discs 18 align with the boundary areas. Furrow discs 22 are slidably mounted on axle 20 so that each furrow disc 22 is received in the gap between adjacent spacer discs 18 at the boundary areas. A set of two spacer discs 18 and one furrow disc 22 interengage (as shown in FIGS. 3 and 3a) to create a slack area 10a along the length of the laminate 10. The laminate 10, including slack area 10a, travels to the first interdigital roller 26 where the slack area is forced into the interdigital grooves 28 on roller 26 by presser disc 32. Presser disc 32 includes a presser area 34 which conforms to the cross section of grooves 28. The presser discs 32 force slack area 10a into the grooves 28 on the first interdigital roller 26 and form taut 37 areas along the remaining width of laminate 10. The taut areas 37 pass between first roller 26 and second roller 38 and are stretched by interdigital grooves 28 and 40 to form microporous laminate 50.

The microporous laminate may optionally be stretched along the length of microporous laminate 50 to increase porosity. The lengthwise stretching may be performed by any known method of forming micropores such as interdigital rolling or differential speed stretching of the laminate 10 either before or after stretching in the cross-machine direction.

Figure 2:
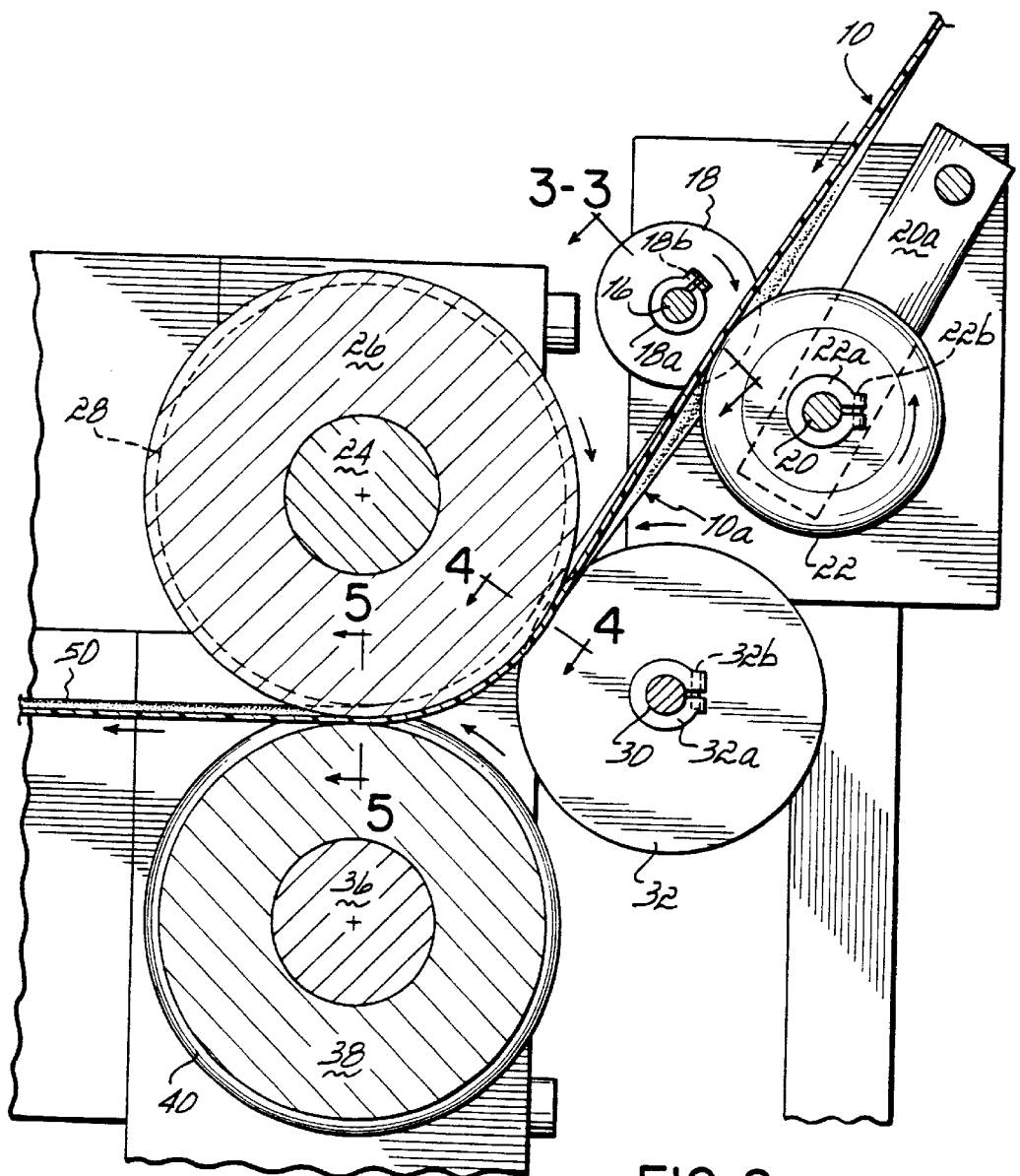
FIG. 2 is a cross-sectional view showing an apparatus for pinhole prevention suitable for use in accordance with one embodiment of the present invention.

As can be seen in FIG. 2, spacer discs 18 are mounted upon axle 16 by collar 18a and set screw 18b. Furrow discs 22 are mounted upon axle 20 by collar 22a and set screw 22b. Axle 20 is mounted upon a rotatable axle support 20a which pivots from a nonengaged position to an engaged position (shown in FIG. 2). The capacity to move furrow discs 22 to a nonengaged position allows for simplified threading of laminate 10 between spacer discs 18 and furrow discs 22. When engaged, a furrow disc 22 is interengaged with a pair of spacer discs 18 to form a furrow which creates slack area 10a at the boundary areas of laminate 10. Interdigital roll 26 is rotatably mounted on axle 24 and presser discs 32 are rotatably mounted on axle 30. Presser discs 32 are movable along the length of axle 30 by collar 32a and set screw 32b. Presser discs 32 are movable along axle 30 in a method similar to the movement of furrow discs 22 along axle 20 as discussed above. The presser disc 32 includes a presser area 34 around its periphery which is complimentary to the grooves on roll 26. Presser area 34 presses the slack area 10a of laminate 10 into the grooves 28 on roll 26 without stretching of the slack area 10a. The width of the laminate 10, other than the slack areas 10a, are held taut against the grooves of roller 26 so that the taut areas 37 are interdigitally stretched between roller 26 and roller 38.

The intermeshing rollers 26, 38 are capable of large engagement depths which may stretch the laminate up to about 200% or more of the original width to form the micropores. The equipment incorporates a controller (not shown) for the shafts 24, 36 of the two intermeshing rollers 26, 38 to control the degree of intermeshing and hence the amount of stretching imparted to the laminate. The controller also keeps shafts 24, 36 parallel when the top shaft is raised or lowered to assure that the teeth of one intermeshing roller always fall between the teeth of the other intermeshing roller to avoid potentially damaging physical contact between intermeshing teeth. This parallel motion is assured by a rack and gear arrangement (not shown) wherein a stationary gear rack is attached to each side frame in juxtaposition to vertically slidable members. A shaft traverses side frames and operates a bearing in each of the vertically slidable members. A gear resides on each end of the shaft and operates in engagement with the racks to produce the desired parallel motion.

Figure 4:
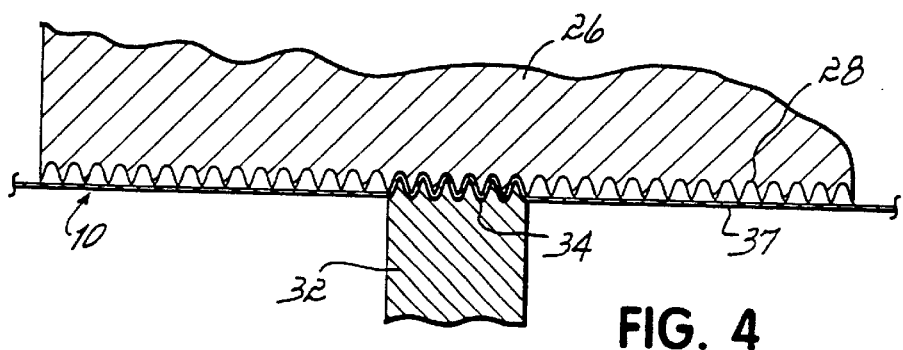
FIG. 4 is a cross-sectional view taken along line 4—4 of FIG. 2 of the presser disc forcing the laminate into the grooves on the first interdigital roller in accordance with one embodiment of the present invention.

As shown in FIG. 3, the force of furrow discs 22 between spacer discs 18 causes the formation of a furrow to form slack area 10a between spacer discs 18. As shown in detail in FIG. 3A the slack area 10a is preferably formed at the boundary areas of the zone laminate where the edges of the non-woven 14 meet polymer film 12. The laminate 10, including slack areas 10a, travels from spacer discs 18 and furrow discs 22 to the first interdigitating roller 26. As the first interdigitating roller 26 rotates about axle 24, slack area 10a is pressed into the grooves 28 of the first interdigitating roller 26 by the complimentary structure 34 of presser rollers 32, as shown in FIG. 4. Due to the creation of the slack area 10a, the laminate 10 is pressed into grooves 28 to form taut areas 37 but without stretching the web. The web then rotates about first interdigitating roller 26 to meet second interdigitating roller 38. Interdigitating roller 38 rotates about axle 36 and grooves 40 intermesh with grooves 28 to stretch the taut areas 37 of laminate in the cross-machine direction, that is, substantially no stretching occurs where the slack areas 10a have been pressed into the grooves 28 on the first roller 26.

As can be seen in FIG. 3 the spacer discs 18 may be variously positioned along axle 16 by use of clamping collars 18a and clamping screws 18b. Each furrow disc 22 includes a clamping collar 22a with a set screw 22b to allow the furrow disc to be variably positioned along axle 20. Similarly, presser discs 32 include clamping collar 32a and set screw 32b to allow the presser discs 32 to be variably positioned along axle 30. This adjustability allows for the processing of various widths of laminate without the need for substantial time spent setting up the machinery.

Figure 5:
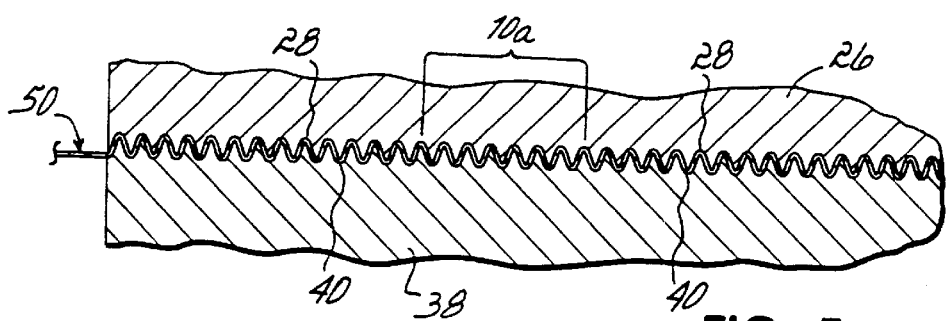
FIG. 5 is a cross-sectional view taken along line 5—5 of FIG. 2 showing the intersection of the first and second interdigital rollers used for stretching the laminate in the cross machine direction.

As seen in FIGS. 4 and 5, presser disc 32 interengages with grooves 28 on interdigital roll 26 by complimentary presser area 34 such as circumferential grooves to interact with a cross directional interdigital stretcher, a helical gear to interengage with a diagonal intermeshing stretcher, or a deformable member which conforms to the surface of roll 26. Presser roller 32 forces the slack area 10a of laminate 10 into the grooves of roller 26 so that the taut areas 37 of laminate 10 are formed on either side of the presser roller 32. These taut areas 37 are subsequently stretched between interdigital rollers 26, 38 to form the microporous zone laminated sheet 50 having substantially unstretched portions along the length thereof. FIG. 13 shows the stretched laminate 50 including micropores 12a in the taut areas 37 of the polymer film 12 and the lack of micropores in the boundary area.

Figure 6:
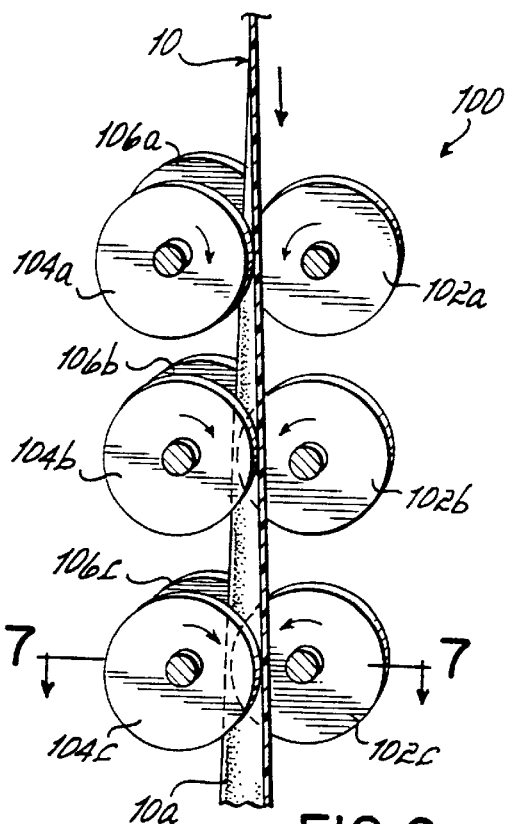
FIG. 6 is a plan view of a progressive roll former suitable for use in creating a slack area in the laminate in accordance with one embodiment of the present invention.
Figure 7:
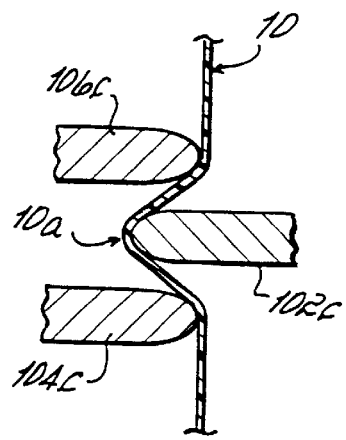
FIG. 7 is a cross-sectional view taken along line 7—7 of FIG. 6.

Other methods of forming a slack area 10a are shown in FIGS. 6–9. As shown in FIGS. 6 and 7 a progressive roll former 100 which includes a series of increasingly overlapped rollers may be used to create slack area 10a. The first set of rollers 102a, 104a, 106a deform the laminate 10 to form a small slack area. The second set of rollers 102b, 104b, 106b have a larger overlap and thus form a larger slack area. The third set of rollers 102c, 104c, 106c are overlapped to form a slack area 10a of the desired shape.

Figure 8:
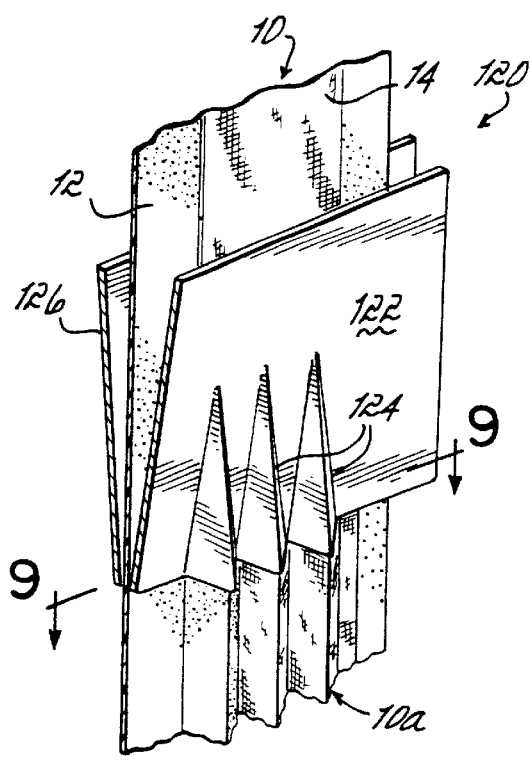
FIG. 8 is a schematic perspective view of a corrugator suitable for creating a slack area in the non-woven laminate suitable for use in the present invention.
Figure 9:
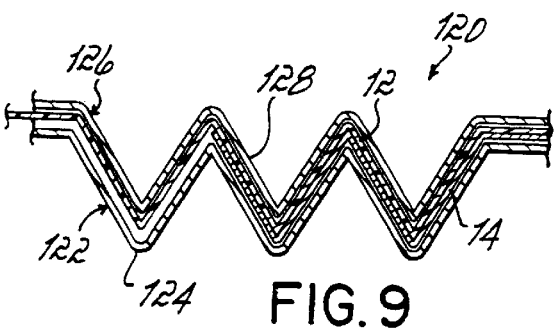
FIG. 9 is a cross-sectional view taken along line 9—9 of FIG. 8.

A corrugator 120, as seen in FIGS. 8 and 9 include a first support plate 122 having a female corrugator 124 and a second support plate 126 which includes male corrugator section 128. The male 128 and female 124 corrugator sections have an increasing cross-sectional area along the length of the web and are nested to cause the laminate 10 to deform and thus create slack area 10a.

The laminate of the present invention may be achieve with the use of a wide variety of polymer films; however, in a preferred form the film is manufactured by the first melt blending a composition of:

(a) about 35% to about 45% by weight of a linear low density polyethylene, (b) about 3% to about 10% by weight of a low density polyethylene, (c) about 40% to about 50% by weight calcium carbonate filler particles, and (d) about 2% to about 6% by weight of a triblock copolymer of styrene selected from the group consisting of styrene-butadiene-styrene, styrene-isoprene-styrene, and styrene-ethylene-butylene-styrene, and blends thereof, extruding the melt blended composition into a nip of rollers with an air knife to form a film at a speed on the order of at least about 550 fpm to about 1200 fpm without draw resonance, and applying an incremental stretching force to the film along lines substantially uniformly across the taut areas of the laminate and throughout its depth to provide a microporous film.

More particularly, in a preferred form, the melt-blended composition consists essentially of about 42% by weight LLDPE, about 4% by weight LDPE, about 44% by weight calcium carbonate filler particles having an average particle size of about 1 micron, and about 3% by weight triblock polymer, especially styrene-butadiene-styrene. If desired, the stiffness properties of the microporous film products may be controlled by including high density polyethylene on the order of about 0–5% by weight and including 0–4% by weight titanium dioxide. Typically, a processing aid such as a fluorocarbon polymer in an amount of about 0.1% to about 0.2% by weight is added, as exemplified by 1-propene, 1,1,2,3,3,3-hexafluoro copolymer with 1,1-difluoroethylene is included in the melt. The triblock polymer may also be blended with oil, hydrocarbon, antioxidant and stabilizer.

Both embossed and flat films may be produced according to the principles of the invention. In the case of an embossed film, the nip of rollers comprised a metal embossing roller and a rubber roller. The compressive force between the rollers forms an embossed film of desired thickness on the order of about 0.5% to about 10 mils. It has also been found that rollers which provide a polished chrome surface form a flat film. Whether the film is an embossed film or a flat film, upon incremental stretching at high speeds, microporous film products are produced having high moisture vapor transmission rate (MVTR) within the acceptable range of about 1000 to 4000 gms/m²/day. It has been found that flat film can be incrementally stretched more uniformly than embossed film. The process may be conducted at ambient or room temperature or at elevated temperatures. As described above, laminates of the microporous film may be obtained with non-woven fibrous webs.

The non-woven fibrous web may comprise fibers of polyethylene, polypropylene, polyesters, rayon, cellulose, nylon, and blends of such fibers. A number of definitions have been proposed for non-woven fibrous webs. The fibers are usually staple fibers or continuous filaments. The non-wovens are usually referred to as a spunbond, carded, meltblown and the like. The fibers or filaments may be bicomponent to facilitate bonding. For example, a fiber having a sheath and core of different polymers such a polyethylne (PE) and polypropylene (PP) may be used or mixtures of PE and PP fibers may be used. As used herein "non-woven fibrous web" is used in its generic sense to define a generally planar structure that is relatively flat, flexible and porous, and is composed of staple fibers or continuous filaments. For a detailed description of non-wovens, see "Nonwoven Fabric Primer and Reference Sampler" by E. A. Vaughn, Association of the Non-woven Fabrics Industry, 3d Edition (1992).

In a preferred form, the microporous laminate employs a film having a gauge or a thickness between about 0.25 and 10 mils and, depending upon use, the film thickness will vary and, most preferably, in disposable applications, is on the order of about 0.25 to 2 mils in thickness. The non-woven fibrous webs of the laminated sheet normally have a weight of about 5 gms/yd² to 75 gms/yd², preferably about 20 to about 40 gms/yd². The composite or laminate can be incrementally stretched in the cross-direction (CD) to form a CD stretched composite. Furthermore, CD stretching may be followed by stretching in the machine direction (MD) to form a composite which is stretched in both CD and MD directions. As indicated above, the microporous film or laminate may be used in many different applications such as baby diapers, baby training pants, catamenial pads and garments, and the like where moisture vapor and air transmission properties, as well as fluid barrier properties, are needed.

The laminate is then incrementally stretched in the cross-direction (CD) or diagnolly using the apparatus of the present invention to form a stretched laminate having unstretched regions along the length of the laminate. Furthermore, stretching according to the present invention may be followed by stretching in the machine direction (MD).

A number of different stretchers and techniques may be employed to stretch the film or laminate of a non-woven fibrous web and microporous-formable film. These laminates of non-woven carded fibrous webs of staple fibers or non-woven spun-bonded fibrous webs may be stretched with the stretchers and techniques described as follows:

The diagonal intermeshing stretcher consists of a pair of left hand and right hand helical gear-like elements on parallel shafts. The shafts are disposed between two machine side plates, the lower shaft being located in fixed bearings and the uppers shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposed of threading material through the intermeshing equipment or in conjunction with a safety circuit which would open all the machine nip points when activated.

A drive is typically utilized to drive the stationery intermeshing roller. If the upper intermeshing roller is to be disengagable for purposes of machine threading or safety, it is preferable to use an antibacklash gearing arrangement between the upper and lower intermeshing rollers to assure that upon reengagement the teeth of one intermeshing roller always falls between the teeth of the other intermeshing roller and potentially damaging physical contact between addenda of intermeshing teeth is avoided. If the intermeshing rollers are to remain in constant engagement, the upper intermeshing roll typically need not be driven. Drive may be accomplished by the driven intermeshing roller through the material being stretched.

The intermeshing rollers closely resemble finepitch helical gears. In the preferred embodiment, the rollers have 5.935" diameter, 45° helix angle, a 0.100" normal pitch, 30 diametral pitch, 14½° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation. With such a diagonal intermeshing stretcher, a presser disc 32 having the configuration of a helical gear would be used. The use of a diagonal intermeshing stretcher provides for a stretching force having force components in both the cross machine direction and the machine direction of the laminate.

The drive for the CD intermeshing stretcher typically operates both upper and lower intermeshing rollers except in the case of intermeshing stretching of materials with a relatively high coefficient of friction. The drive need not be antibacklash, however, because a small amount of machine direction misalignment or drive slippage will cause no problem.

The CD intermeshing elements are machined from solid material but can best be described as an alternating stack of two different diameter disks. In the preferred embodiment, the intermeshing disks would be 6" in diameter, 0.031" thick, and have a fuller radius on their edge. The spacer disks separating the intermeshing disks would be 5½" in diameter and 0.069" in thickness. Two rolls of the configuration would be able to be intermeshed up to 0.231" leaving 0.019" clearance for material on all sides. As with the diagonal intermeshing stretcher, this CD intermeshing element configuration would have a 0.100" pitch.

The MD intermeshing stretching equipment is identical to the diagonal intermeshing stretch except for the design of the intermeshing rollers. The MD intermeshing rollers closely resemble fine pitch spur gears. In the preferred embodiment, the rolls have a 5.933" diameter, 0.100" pitch, 30 Diametral pitch, 14½° pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

The above described diagonal or CD intermeshing stretchers may be employed with the pin-hole prevention apparatus of the present invention to produce the incrementally stretched film or laminate of non-woven fibrous web and microporous-formable film to form the microporous film products of this invention. For example, the stretching operation may be employed on an extrusion laminate of a non-woven fibrous web of staple fibers of spun-bonded filaments and microporous-formable thermoplastic film. In one of the unique aspects of this invention, a laminate of a non-woven fibrous web of spun-bonded filaments may be incrementally stretched to provide a very soft fibrous finish to the laminate that looks like cloth. The laminate of non-woven fibrous web and microporous-formable film is incrementally stretched using, for instance, the CD and/or MD intermeshing stretcher with one pass through the stretcher with a depth of roller engagement at about 0.060 inch to 0.120 inch at speeds from about 550 fpm to 1200 fpm or faster. The results of such incremental or intermesh stretching produces laminates that have excellent breatheability and liquid-barrier properties, yet provide superior bond strengths and soft cloth-like textures.

The microporous laminate typically employs a film having a gauge or a thickness between about 0.25 and 10 mils and, depending upon use, the film thickness will vary and, most preferably, in disposable applications is the order of about 0.25 to 2 mils in thickness. The non-woven fibrous webs of the laminated sheet normally have a weight of about 5 grams per square yard to 75 grams per square yard preferably about 20 to about 40 grams per square yard.

The following examples illustrate the method of making microporous film and laminates of this invention. In light of these examples and this further detailed description, it is apparent to a person of ordinary skill in the art that variations thereof may be made without departing from the scope of this invention.

EXAMPLES 1–5

Blends of LLDPE and LPDE having the compositions reported in the following TABLE 1 were extruded to form films and the films were then incrementally stretched to provide microporous films.

TABLE 1

| Formulation (by wt.) | 1 | 2 | 3 | 4 | 5 |
|---|---|---|---|---|---|
| $CaCO_3$ | 44.2 | 44.2 | 44.2 | 44.2 | 44.2 |
| LLDPE | 44.1 | 44.9 | 41.9 | 41.9 | 41.9 |
| LDPE | 1.5 | 3.7 | 3.7 | 3.7 | 3.7 |
| Others* | 10.2 | 10.2 | 10.2 | 10.2 | 10.2 |
| Screw RPM | | | | | |
| A | 33 | 45 | 57 | 64 | 75 |
| B | 33 | 45 | 57 | 64 | 75 |
| Basis wt. (gms/m²) | 45 | 45 | 45 | 45 | 45 |
| Gauge (mils) | 2 | 2 | 2 | 2 | 2 |
| Line Speed (fpm) | 550 | 700 | 900 | 1000 | 1200 |
| Air Knife (cfm/inch) | 5–25 | 5–25 | 5–25 | 5–25 | 5–25 |

TABLE 1-continued

| Formulation (by wt.) | 1 | 2 | 3 | 4 | 5 |
|---|---|---|---|---|---|
| Web Stability | Poor gauge control with draw resonance | Good web stability without draw resonance | | | |

*Other components include 2.5% by weight of a styrene-butadiene-styrene (SBS) triblock polymer, Shell Kraton 2122X, which is an SBS <50% by wt. + mineral oil <30% by wt., EVA copolymer <15% by wt., polystyrene <10% by wt., hydrocarbon resin <10% by wt., antioxidant/stabilizer <1% by wt., and hydrated amorphous silica <1% by wt.

Each of the formulations of 1–5 were extruded into films employing an extrusion apparatus. The formulations of Examples 1–5 were fed from a extruder through a slot die to form the extrudate into the nip of a rubber roll and a metal roll. The incoming webs of non-woven material were also introduced into the nip of the rolls. In Examples 1–5, the thermoplastic film was produced for subsequent incremental stretching to form the microporous film. As shown in TABLE 1, over speeds of about 550 fpm to 1200 fpm, a polyethylene film on the order of about 2 mils in thickness was made which is taken off the roller. The compressive force at the nip is controlled such that the film is made without pin-holing and without draw resonance in the case of Examples 2–5. The melt temperatures from the feed zone to the screw tip of extruders were maintained at about 400–430° F. with die temperatures of approximately 450° F. to extrude the precursor film around 2 mils (45 g/m²).

As shown in TABLE 1, over speeds of about 550 fpm to 1200 fpm, a polyethylene film on the order of about 2 mils in thickness was made which is taken off the roller. The air knife has a length of about 120" and an opening of about 0.035"–0.060" and air is blown through the opening and against the extrudate at about 5 cfm/inch to 25 cfm/inch. The compressive force at the nip and the air knife are controlled such that the film is made without pin-holing and without draw resonance in the case of Examples 2–5. Where the LDPE was included in the composition at a level of 1.5% by weight, draw resonance was encountered at a line speed of 550 fpm. However, when the LPDE was included in the formulation at a level of 3.7% by weight with the LLDPE at a level of 44.1–44.9% by weight, film production was able to be achieved at high speeds greater than 550 fpm up to 1200 fpm without draw resonance. The melt temperatures from the feed zone to the screw tip of the extruders were maintained at about 400–430° F. with die temperatures of approximately 450° F. to extrude the precursor film around 2 mils (45 gms/m²).

Figure 10:
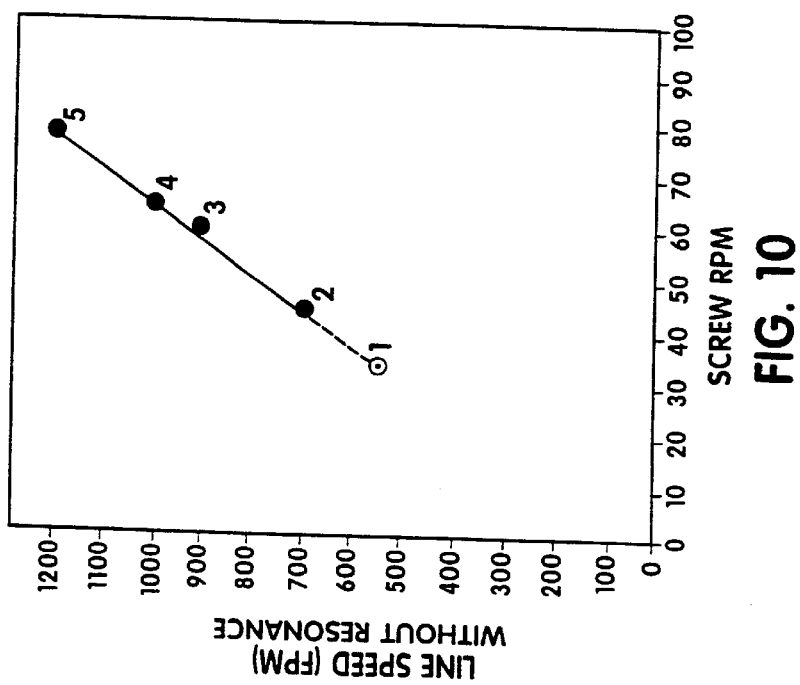
FIG. 10 is a graph showing the relationship between line speed and screw RPM of an extruder for use with the present invention.

FIG. 10 is a graph demonstrating the line speeds for Examples 1–5 and the necessary screw speed. Example 1, which contained only 1.5% by weight of LDPE, resulted in a poor film gauge control with draw resonance even with the air knife. However, when the LDPE was increased to about 3.7% by weight, excellent web stability was achieved without draw resonance even when line speeds were increased to about 1200 fpm.

Figure 12:
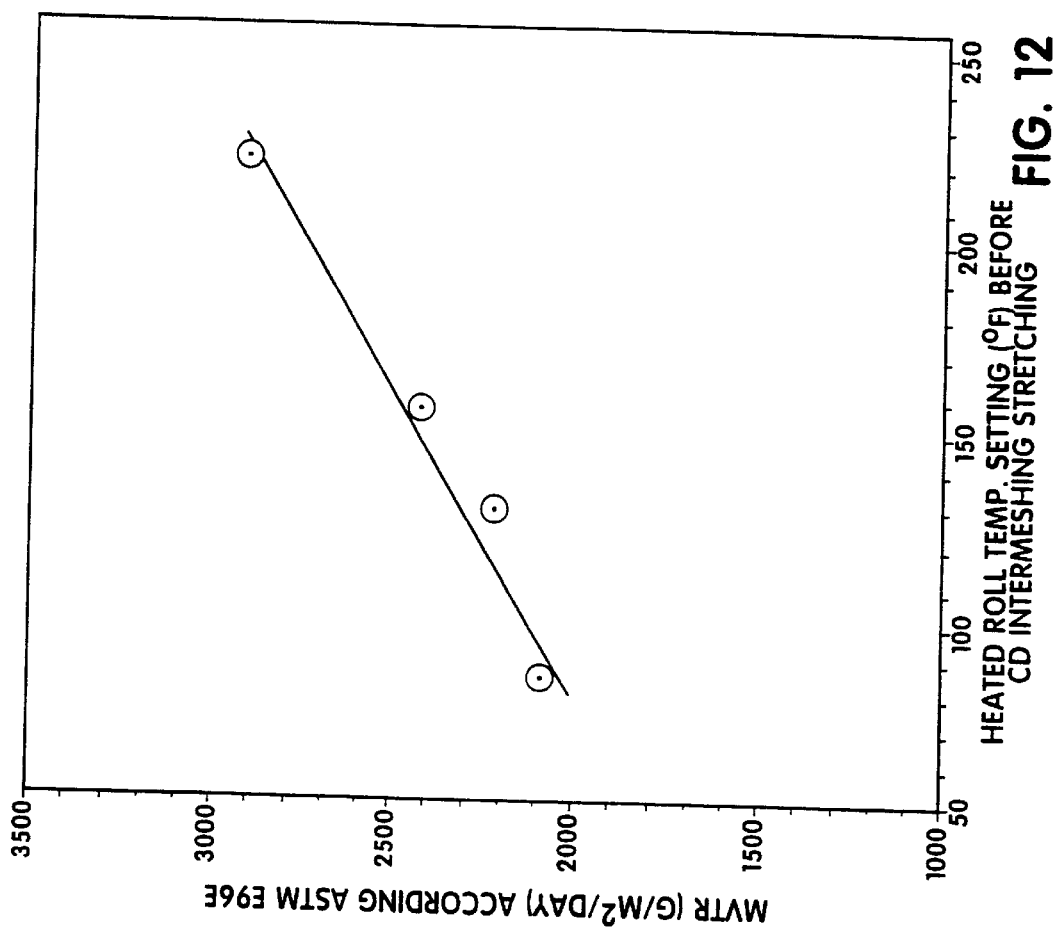
FIG. 12 is a graph showing the relationship between moisture vapor transmission rate and finish roll temperature prior to CD intermeshing.
Figure 11:
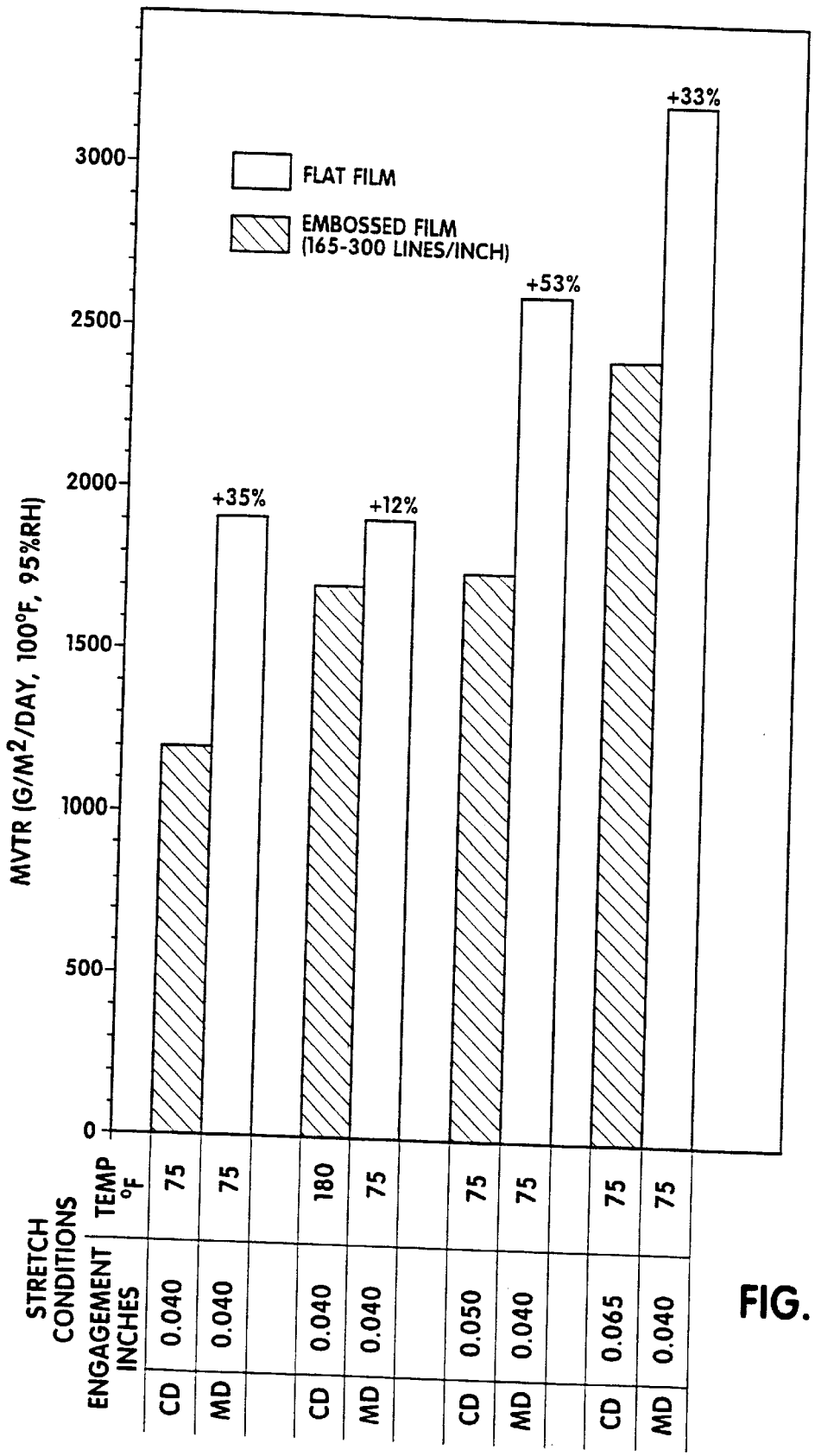
FIG. 11 is a graph demonstrating the relationship between moisture vapor transmission properties and incremental stretching.

FIG. 11 is a graph demonstrating the moisture vapor transmission properties (MVTR) of both embossed and flat films resulting from incrementally stretching the precursor films of Examples 2–5 under different temperatures and stretch roller engagement conditions. The MVTRs for the embossed film on the order of about 1200–2400 gms/m²/day were achieved, whereas MVTRs for the flat film on the order of about 1900–3200 gms/m²/day were achieved. FIG. 12 shows the impact of the temperature of the CD preheat roller upon MVTR. The MVTR for the film varied between about 2000–2900 gms/m²/day with the roller preheat temperature between about 75–220 F. The embossed film was made with a metal embossing roller having a rectangular engraving of CD and MD lines with about 165–300 lines per inch. This pattern is disclosed, for example, in U.S. Pat. No. 4,376,147 which is incorporated herein by reference. This micro pattern provides a matte finish to the film but is undetectable to the naked eye.

Those skilled in the art will recognize that the exemplary embodiment illustrated in the drawings is not intended to limit the invention. Indeed, those skilled in the art will recognize that other alternative embodiments may be used without departing from the scope of the invention.

What is claimed is:

1. A laminate of non-woven fibrous web and microporous polymer film comprising:

a microporous polymer film; and at least one strip of a non-woven fibrous web having opposite edges, the strip laminated to the film to form a laminated area along the length of the film and unlaminated film areas along the opposite edges, each of said opposite strip edges defining a boundary area between the laminated area and the unlaminated areas;

wherein each boundary area is substantially unstretched and the laminated area and the unlaminated areas are interdigitally stretched such that each boundary area is substantially pinhole free.

2. The microporous laminate sheet of claim 1 wherein the film and non-woven laminate areas and the unlaminated polymer film areas are interdigitally stretched in the cross-machine direction.

3. The microporous laminate sheet of claim 1 wherein the polymer film comprises:

a polyolefin; and a pore initiator.

4. The microporous laminate sheet of claim 1 wherein the polymer film comprised a blend of linear low density polyethylene and low density polyethylene.

5. The microporous laminate sheet of claim 1 wherein the polymer film comprises:

about 35% to about 45% by weight of a linear low density polyethylene, about 3% to about 10% by weight of a low density polyethylene, about 40% to about 50% by weight calcium carbonate filler particles, and about 2% to about 6% by weight of a rubber compound.

6. The microporous laminate sheet of claim 5 wherein said polymer film consists essentially of about 42% by weight linear low density polyethylene, about 4% by weight low density polyethylene, about 44% calcium carbonate filler particles, and about 3% by weight triblock polymer.

7. The microporous laminate sheet of claim 5 wherein said polymer film further comprises about 0–5% by weight high density polyethylene, about 0–4% by weight titanium dioxide, and about 0.1% to about 0.2% by weight processing aid.

8. The microposous laminate sheet of claim 7 wherein said polymer film comprises about 4% by weight high density polyethlene, about 3% by weight titanium dioxide, and about 0.1% by weight fluorocarbon polymer processing aid.

9. The microporous laminate sheet of claim 8 wherein said fluorocarbon polymer processing aid is 1-propene, 1,1,2,3,3,3-hexafluoro copolymer with 1,1-difluoroethylene.

10. The microporous laminate sheet of claim 5 wherein said rubber compound is a triblock copolymer of styrene selected from the group consisting of styrene-butadiene-styrene, styrene-isoprene-styrene, and styrene-ethylene-butylene-styrene.

11. The microporous laminate sheet of claim 10 wherein said triblock polymer is preblended with oil, hydrocarbon, antioxidant and stabilizer.

12. A microporous laminate sheet of a polymer film layer and a non-woven fibrous web comprising:

a microporous polymer film layer; and at least one non-woven fibrous web having opposite edges laminated to the microporous polymer film layer forming a laminated area and an unlaminated area of the polymer film layer and having boundary areas at the edges of the laminated non-woven fibrous web;

wherein the laminated area and the unlaminated polymer film area are interdigitally stretched and the boundary areas are substantially unstretched such that the boundary areas are substantially pinhole free.

13. The microporous laminate sheet of claim 12 wherein the polymer film comprises:

a polyolefin; and a particulate filler.

14. The microporous laminate sheet of claim 12 wherein the polymer film comprises:

about 35% to about 45% by weight of a linear low density polyethylene, about 3% to about 10% by weight of a low density polyethylene, about 40% to about 50% by weight calcium carbonate filler particles, and about 2% to about 6% by weight of a rubber compound.

15. The microporous laminate sheet of claim 12 wherein the polymer film comprises:

about 42% by weight linear low density polyethylene, about 4% by weight low density polyethylene, about 44% calcium carbonate filler particles, and about 3% by weight triblock polymer.

16. The microporous laminate sheet of claim 15 wherein the triblock polymer is a styrene-butadiene rubber.

* * * * *

UNITED STATES PATENT AND TRADEMARK OFFICE
CERTIFICATE OF CORRECTION

PATENT NO. : 6,475,591 B2
DATED : November 5, 2002
INVENTOR(S) : Thomas G. Mushaben It is certified that error appears in the above-identified patent and that said Letters Patent is hereby corrected as shown below:

Column 1,
Line 8, "6,265,645" should be -- 6,265,045 --

Column 2,
Line 11, after "nips." insert -- The '203 and '941 patents are directed to co-extruding multiple polymeric films with unstretched non-woven webs at pressure roller nips. --
Line 16, "piles" should be -- plies --

Column 5,
Line 49, "laminate" should be -- laminate 10 --

Column 6,
Line 28, "achieve" should be -- achieved --
Line 30, "manufactured by the first melt blending" should be -- manufactured by first melt blending --

Column 7,
Line 4, "0.5% to about 10 mils" should be -- 0.5 to about 10 mils --
Line 25, "polyethylne" should be -- polyethylene --
Line 53, "diagnolly" should be -- diagonally --

Column 8,
Line 2, "uppers shaft" should be -- upper shaft --
Line 59, "fuller radius" should be -- full radius --
Line 61, "of the configuration" should be -- of this configuration --

Column 9,
Line 17, "fibers of spun-bonded" should be -- fibers or spun-bonded --

Column 11,
Line 40, "comprised" should be -- comprises --

UNITED STATES PATENT AND TRADEMARK OFFICE
CERTIFICATE OF CORRECTION

PATENT NO.    : 6,475,591 B2
DATED         : November 5, 2002
INVENTOR(S)   : Thomas G. Mushaben It is certified that error appears in the above-identified patent and that said Letters Patent is hereby corrected as shown below:

Column 12,
Line 4, "microposous" should be -- microporous --
Line 6, "polyethlene" should be -- polyethylene --

Signed and Sealed this

Eighth Day of April, 2003

JAMES E. ROGAN
*Director of the United States Patent and Trademark Office*